(12) United States Patent
Fouda et al.

(10) Patent No.: US 11,719,097 B2
(45) Date of Patent: Aug. 8, 2023

(54) SYSTEMS AND METHODS FOR PRODUCTION AND RESERVOIR MONITORING

(71) Applicant: Halliburton Energy Services, Inc., Houston, TX (US)

(72) Inventors: Ahmed Fouda, Pearland, TX (US); Wei Zhang, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/514,309

(22) Filed: Oct. 29, 2021

(65) Prior Publication Data

US 2023/0133939 A1    May 4, 2023

(51) Int. Cl.
*G01V 3/20* (2006.01)
*E21B 49/08* (2006.01)
*E21B 47/135* (2012.01)

(52) U.S. Cl.
CPC ........ *E21B 49/0875* (2020.05); *E21B 47/135* (2020.05); *G01V 3/20* (2013.01)

(58) Field of Classification Search
CPC .... E21B 49/0875; E21B 49/08; E21B 49/087; E21B 49/084; E21B 47/135; E21B 47/13; E21B 47/125; E21B 47/12; G01V 3/20; G01V 3/24; G01V 3/34
See application file for complete search history.

(56) References Cited

U.S. PATENT DOCUMENTS 10,132,847 B2 *  11/2018  Xie .......................... G01F 1/60
10,281,422 B2    5/2019  Marashdeh et al.
2013/0046473 A1  2/2013  Zhang et al.
2015/0168582 A1  6/2015  Zhang et al.
2015/0346376 A1  12/2015  Fouda et al.
2017/0292367 A1  10/2017  Fouda et al.
2017/0321544 A1  11/2017  Wilson et al.
2017/0336525 A1  11/2017  Wilson et al.

(Continued)

FOREIGN PATENT DOCUMENTS

EP    1310631    6/2006

OTHER PUBLICATIONS

International Search Report and Written Opinion for Application No. PCT/US2021/058629, dated Jul. 12, 2022.

*Primary Examiner* — Tarun Sinha
*Assistant Examiner* — James I Burris
(74) *Attorney, Agent, or Firm* — John Wustenberg; C. Tumey Law Group PLLC (57) ABSTRACT

A system and method for identifying a downhole fluid. The system may include at least one electrode station that is disposed on a non-conductive material and at least two electrodes coupled to the at least one electrode station. The system may further include at least one acquisition unit that is configured to measure a voltage across the two electrodes of the at least one electrode station and an information handling system connected to the at least one acquisition unit. The method may include injecting a current into a sensing domain with at least two electrodes disposed on at least one electrode station, measuring a voltage across the at least two electrodes at the at least one electrode station using an acquisition unit, and sending the measured voltage to an information handling system connected to the acquisition unit by at least one communication line.

20 Claims, 8 Drawing Sheets

(56) References Cited

U.S. PATENT DOCUMENTS

| | | | |
|---|---|---|---|
| 2018/0038222 A1 | 2/2018 | Samson et al. | |
| 2018/0135405 A1* | 5/2018 | Fouda | E21B 47/047 |
| 2018/0252100 A1 | 9/2018 | Ranjan et al. | |
| 2018/0274361 A1 | 9/2018 | Fouda et al. | |
| 2018/0283168 A1* | 10/2018 | Ranjan | E21B 47/113 |
| 2019/0218904 A1 | 7/2019 | Fouda et al. | |
| 2020/0073004 A1* | 3/2020 | Fouda | G01V 3/02 |
| 2020/0074588 A1 | 3/2020 | Fouda | |
| 2021/0183009 A1 | 6/2021 | Fouda | |
| 2021/0256671 A1 | 8/2021 | Guner et al. | |

\* cited by examiner

SYSTEMS AND METHODS FOR PRODUCTION AND RESERVOIR MONITORING

BACKGROUND

Oilfield operators drill boreholes into subsurface reservoirs to recover oil and other hydrocarbons. If the reservoir has been partially drained or if the oil is particularly viscous, an oilfield operator will often inject fluids (e.g., water, steam, chemicals, gas, etc.) into the reservoir via. One or more injection wells to encourage the hydrocarbons to migrate toward the production well to be produced to the surface. Such operations are known as enhanced oil recovery (EOR) operations and infecting such fluids is often referred to as "flooding."

Flooding can be tailored with varying fluid mixtures, flow rates/pressures, and injection sites, but may nevertheless be difficult to control due to inhomogeneity in the structure of the subsurface formations. The interface between the reservoir fluid and the injected fluid, often termed the "flood front" or the "waterflood front," may develop protrusions and irregularities that may reach the production well before the bulk of the residual oil has been flushed from the reservoir. Proper management of the fluid front is essential for optimal recovery of oil and profitability of the water flooding operation. Improper management can create permanent, irreparable damage to well fields that can trap oil so that subsequent water flooding becomes futile.

To properly manage the fluid front, personnel may monitor the phase of fluids that are recovered from one or more boreholes. Additionally, one or more systems may be utilized to measure resistivity of the formation to identify movement of the fluid front. Current methods and systems monitoring the type of fluid flow in completions requires wireline- or coiled-tubing-conveyed production logging tools (e.g., fluid capacitance logging). These tools partially obstruct the flow in the production tubing and limits the capability of continuous monitoring of fluid flow properties. A less invasive system and method of monitoring fluid flow within production tubing and across a formation is needed.

BRIEF DESCRIPTION OF THE DRAWINGS

These drawings illustrate certain aspects of some of the embodiments of the present disclosure, and should not be used to limit or define the disclosure.

DETAILED DESCRIPTION

This disclosure presents systems and methods that utilize an electrical capacitance tomography (ECT) system to monitor production operations and formation monitoring operations simultaneously in accordance with one or more embodiments. As discussed below, the ECT system may perform as a dual monitoring system for simultaneous monitoring of production and formation fluids in open-hole completions. Production monitoring can be achieved by ECT sensors (e.g., electrodes) deployed around non-conducting sections of the production conduit. The ECT sensors may operate in the MHz range (i.e., 1 MHz to 1000 MHz) to provide time-lapse cross-sectional maps of the fluid flowing through the conduit. The same electrodes may be simultaneously excited with low frequency current, in the kHz range, for deep formation monitoring around the borehole. The ECT system may be disposed on a casing string or liner hanger system.

Figure 1:
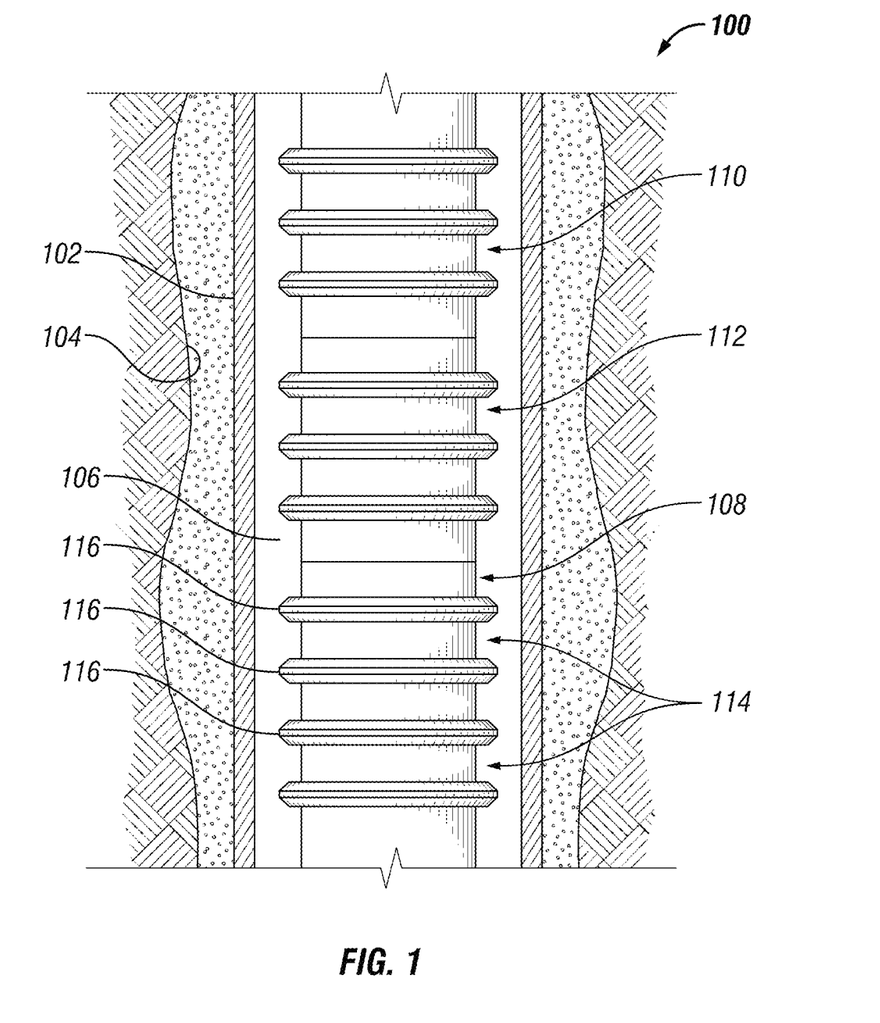
FIG. 1 is an example of a liner hanger disposed in a wellbore.

FIG. 1 illustrates an example of an expandable liner hanger system 100. In expandable liner hanger system 100, a casing string 102 has been installed and cemented within a wellbore 104. An expandable liner hanger 108 may be hung, extending downhole from a lower end of casing string 102. An annulus 106 may be created between casing string 102 and a work string 110. In embodiments, an expandable liner hanger 108 may support additional wellbore casing, operational tubulars or tubing strings, completion strings, downhole tools, etc., for positioning at greater depths.

As used herein, the terms "liner," "casing," and "tubular" are used generally to describe tubular wellbore items, used for various purposes in wellbore operations. Liners, casings, and tubulars may be made from various materials (metal, plastic, composite, etc.), can be expanded or unexpanded as part of an installation procedure, and may be segmented or continuous. It is not necessary for a liner or casing to be cemented into position. Any type of liner, casing, or tubular may be used in keeping with the principles of the present disclosure.

As further illustrated in FIG. 1, expandable liner hanger 108 may be sealed and secured at an upper end of casing string 102. Alternatively, expandable liner hanger 108 may be sealed and secured above a window (not shown) formed through a sidewall of casing string 102, with expandable liner hanger 108 extending outwardly through the window into a branch or lateral wellbore. Without limitation, many different configurations and relative positions of casing string 102 and expandable liner hanger 108 may be possible.

In examples, as also shown in FIG. 1, a setting tool 112 may be connected proximate expandable liner hanger 108 on work string 110. Work string 110 may convey setting tool 112 and expandable liner hanger 108 into wellbore 104, conduct fluid pressure and flow, transmit torque, tensile and compressive force, etc. Setting tool 112 may facilitate conveyance and installation of expandable liner hanger 108, in part by using the torque, tensile and compressive forces, fluid pressure and flow, etc., as delivered by work string 110.

In FIG. 1, expandable liner hanger 108 is illustrated with a plurality of anchoring ridges 116 positioned on and attached to expandable liner hanger 108. In examples, when expandable liner hanger 108 may be expanded, such as with an expansion cone, discussed below, into anchoring and sealing engagement with casing string 102, the plurality of anchoring ridges 116 engage the interior of casing string 102. It should be noted that in examples rubber elements may be used in conjunction with anchoring ridges 116. However, in a geothermal well, expandable liner hanger 108 may experience swings in temperature, specifically, increases in temperature during geothermal well operations which may be detrimental to maintaining contact between expandable liner hanger 108 and casing string 102. This may be due to fluid expansion exerting a force on expandable liner hanger 108. For example, the body of expandable liner hanger 108 and anchoring ridges 116 may confine and trap fluid against casing string 102. As temperatures fluctuate and rise in a geothermal well, the fluid may expand, which may push against casing string 102, expandable liner hanger 108, and anchoring ridges 116. This may in turn lead anchoring ridges 116 dislodging from casing string 102 and the ultimate failure of expandable liner hanger 108.

Figure 2:
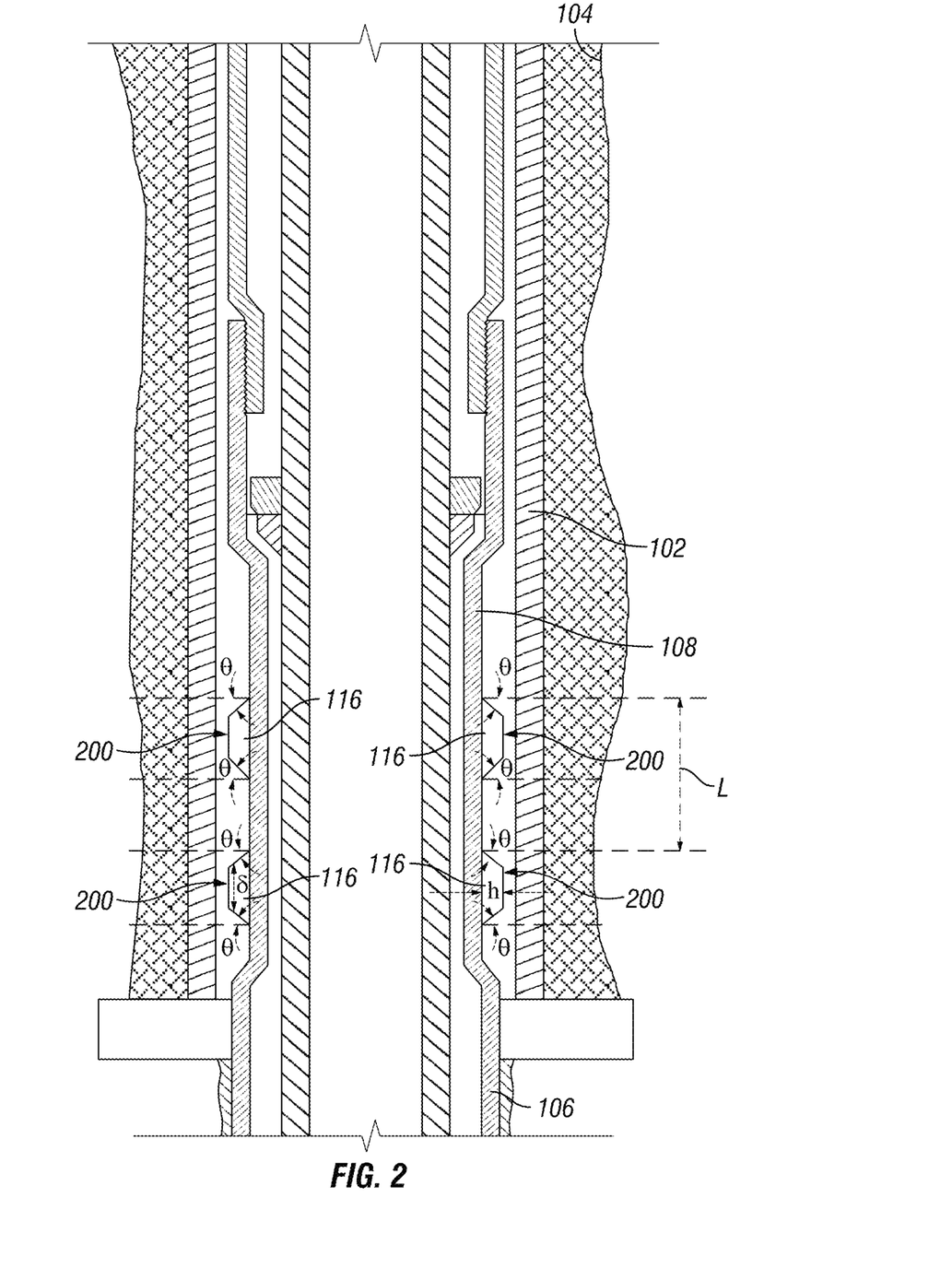
FIG. 2 is a cross-sectional view of a liner hanger system disposed in a wellbore.

FIG. 2 depicts a cross-sectional view of expandable liner hanger 108 and anchoring ridges 116. Without limitation, anchoring ridges 116 may be metal spikes. The metal spikes may be made of any suitable steel grade, aluminum, any other ductile material, and a combination thereof. In certain implementations, the spikes may be made from a combination of one or more of the recited materials. In certain embodiments, anchoring ridges 116 may be made from AISI4140 steel or AISI4340 steel. In examples, each anchoring ridge 116 may be a circular ring that extends along an outer perimeter of expandable liner hanger 108 at a desired axial location. However, the present disclosure is not limited to this particular configuration of anchoring ridges 116. For instance, in certain embodiments, anchoring ridges 116 may extend along an axial direction of expandable liner hanger 108. Moreover, in certain implementations, different anchoring ridges 116 may have different surface geometries without departing from the scope of the present disclosure. Specifically, a first spike may extend along an outer perimeter of expandable liner hanger 108 at a first axial position along expandable liner hanger 108 and a second spike may extend along an outer perimeter of expandable liner hanger 108 at a second axial position along expandable liner hanger 108.

In examples, anchoring ridges 116 may be formed using any suitable methods known to those of ordinary skill in the art. For instance, in certain implementations, anchoring ridges 116 may be formed by machining the body of expandable liner hanger 108. However, the present disclosure is not limited to machined spikes. Without limitation, any suitable methods known to one of ordinary skill in the art may be used to form anchoring ridges 116. For instance, in examples, anchoring ridges 116 may be formed as a separate structure that may be coupled to expandable liner hanger 108 using any suitable coupling mechanisms known to one of ordinary skill in the art. Moreover, any number of anchoring ridges 116 may be formed along the axial direction of expandable liner hanger 108. The number of anchoring ridges 116 formed along the axial direction of expandable liner hanger 108 may depend upon a number of factors such as, for example, the anchor load that is desired to be reached.

Accordingly, each of anchoring ridges 116 provide a metal-to-metal seal between expandable liner hanger 108 and casing string 102. In examples, anchoring ridges 116 may have a flat top portion 200. The use of anchoring ridges 116 with a flat top portion 200 as opposed to pointed spikes or threads may be beneficial because flat anchoring ridges 116 may be less sensitive to casing variations and have a higher load capacity than pointed spikes. Anchoring ridges 116 may be symmetrically aligned such that an angle θ is the same on both sides of each anchoring ridges 116 as shown in FIG. 2. However, in examples, the angle θ may be different on the opposing sides of anchoring ridges 116 without departing from the scope of the present disclosure. The angle θ is referred to herein as the "spike angle." In examples, the spike angle (θ) is selected such that after expansion, anchoring ridges 116 remain substantially normal to expandable liner hanger 108 body. For instance, in certain implementations, the spike angle (θ) may be selected to be in a range of from approximately 30° to approximately 70°.

Moreover, as shown in FIG. 2, the dimension δ denotes the width of flat portion 200 of anchoring ridges 116 and is referred to herein as the spike width (δ). The spike width (δ) may be selected as desired such that expandable liner hanger 108 may expand without significant increase in expansion pressure while maintaining optimum contact area between anchoring ridges 116 and casing string 102. Specifically, as anchoring ridges 116 are expanded, flat portion 200 of the spike interfaces with the inner surface of casing string 102 and may eventually couple expandable liner hanger 108 to casing string 102. As shown in FIG. 2, the spacing between the anchoring ridges 116 along the length of expandable liner hanger 108 is denoted as "L". The distance between the spikes (L) may be configured such that the deformation zones in casing string 102 induced by the anchoring ridges 116 may be isolated. The distance (L) may be selected to maximize the hanging capacity per spike. The term "hanging capacity" as used herein refers to the maximum downward load (anchor load) a hanger can carry without inducing an appreciable relative motion between the expandable liner hanger 108 and casing string 102 after the hanger is set in the casing. Accordingly, in certain implementations, it may not be desirable for the distance between the spikes (L) to fall below a certain threshold value. For instance, in examples, it may not be desirable for the distance between the spikes (L) to be less than three times the thickness of casing string 102. Accordingly, the distance (L) between anchoring ridges 116 has an optimum value which is dependent upon a number of factors including, but not limited to, the outer diameter of the hanger (hanger OD), the hanger wall thickness, the inner diameter of the casing (casing ID) and the casing wall thickness. Moreover, the available length of expandable liner hanger 108 may limit the number of anchoring ridges 116 that may be placed thereon. Beyond this optimum value an increase in the distance (L) may no longer improve the hanging capacity per anchoring ridges 116.

The height (H) of anchoring ridges 116 (and their resulting outer diameter (OD)) may be selected so that it is between an upper and a lower boundary. The upper spike height boundary may be selected as a function of the amount of flow area that is desired around expandable liner hanger. In contrast, the lower spike height boundary may be selected as a function of the distance desired between expandable liner hanger 108 and casing string 102. Moreover, if the spike height is too large, it may destroy downhole equipment as it expands and if the spike height is too low, it wouldn't be able to support a liner as required. Configuration of the height (H) may cause a significant deformation of anchoring ridges 116 and an appreciable localized plastic deformation of the casing. Once anchoring ridges 116 of expandable liner hanger 108 are expanded, anchoring ridges 116 and the inner diameter of casing string 102 form multiple metal-to-metal seals. Accordingly, anchoring ridges 116 of expandable liner hanger 108 provide mechanical support for expandable liner hanger 108.

Figure 3A:
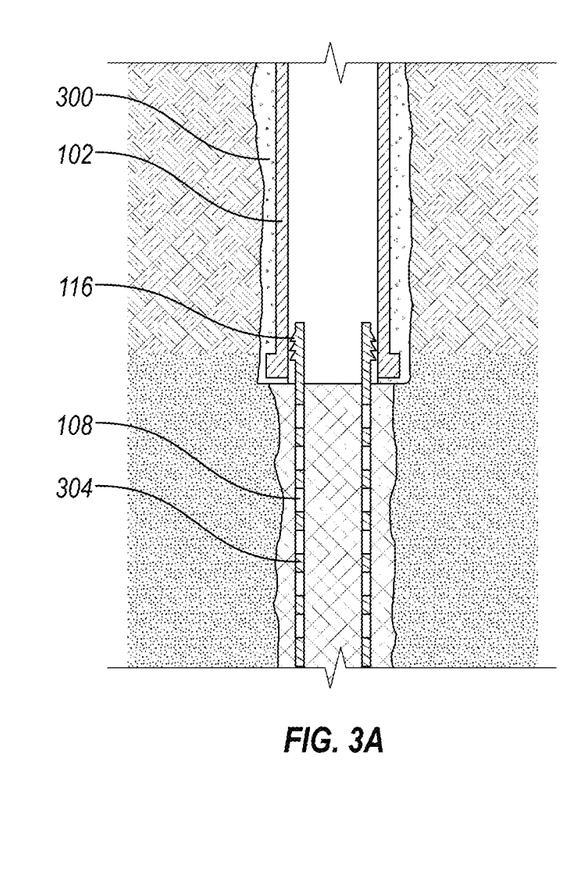
FIGS. 3A and 3B illustrate a slotted liner hanger.

FIG. 3A illustrates expandable liner hanger 108 attached to casing string 102 through one or more anchoring ridges 116. Casing string 102 may be cemented with cement 300 to subterranean formation 302. As further illustrated, liner hanger 108 may be disposed in open hole 304, which may be identified as an open-hole completion. In such operations, liner hanger 108 may be slotted with one or more slots 306 (i.e., perforations) disposed in liner hanger 108. One or more slots 306 may allow for formation fluids to pass from subterranean formation 302, through liner hanger 108 and to the surface through casing string 102. It should be noted that slots 306 may be any suitable size, length, and/or width. Additionally, slots 306 may be disposed on liner hanger 108 in any suitable arrangement and/or order.

During production operations, personnel may want to know and identify the type of formation fluid that may be moving through liner hanger 108 and casing string 102 as the formation fluid moves to the surface through casing string 102. Methods and systems discussed bel may utilize electrical capacitance tomography (ECT) to determine the type of formation fluid moving through liner hanger 108 from subterranean formation 302 (e.g., referring to FIG. 3A). ECT is a non-invasive imaging technique and system that may produce imaging (frame) rates in the hundreds of frames-per-second, thus enabling high-speed real-time measurements of fast reactions and physical flow processes.

Figure 3B:
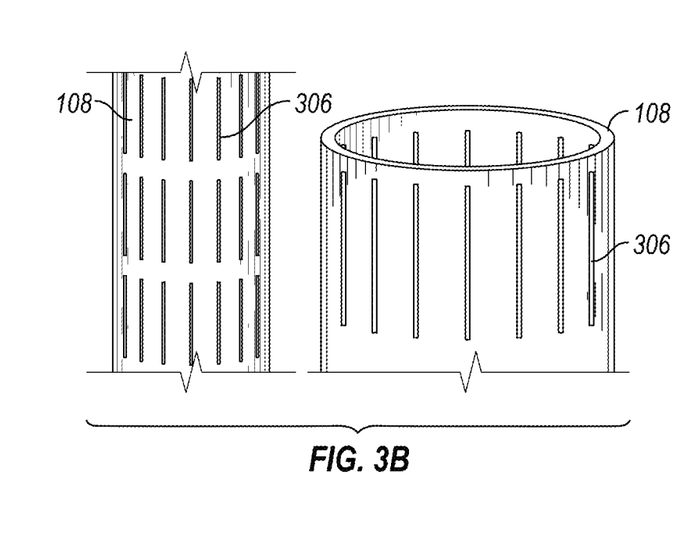
Figure 4:
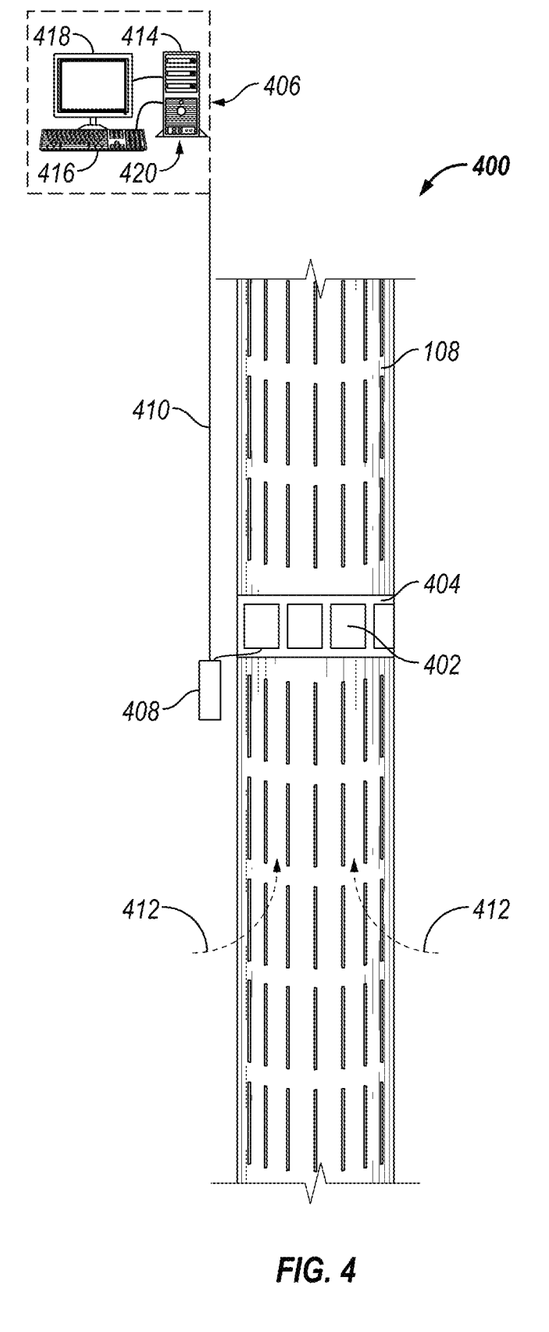
FIG. 4 illustrates an electrical capacitance tomography (ECT) system disposed on a liner hanger.

FIG. 4 illustrates an operation in which an ECT system 400 may be utilized. As illustrated ECT system 400 may be disposed on liner hanger 108, however, in other examples, ECT system 400 may be disposed on production tubing and/or casing string 102 and operate with the methods and systems discussed below. In examples with production tubing, production tubing may be disposed within liner hanger 108 and/or casing string 102. Additionally, production tubing may be disposed in open hole 304 (e.g., referring to FIG. 3) without liner hanger 108. ECT system 400 may comprise an array of electrodes 402 disposed circumferentially around liner hanger 108. Each electrode 402 may inject current into a sensing domain through capacitive coupling. A sensing domain is defined as the area in which current is injected to identify a property of a formation fluid 412 or the formation itself. In examples, the sensing domain may be within liner hanger 108 or outside of liner hanger 108 in subterranean formation 302. Mutual impedance measurements may be taken across each electrode pair, and the resulting array of measurements is processed to reconstruct cross-sectional or volumetric conductivity and permittivity maps. With continue reference to FIG. 4, one or more electrodes 402 may be disposed on an outer surface of non-conductive section 404. Non-conductive section 404 is a part of liner hanger 108 or disposed on liner hanger 108. Non-conductive section 404 may be made of any suitable maters, such as, but not limited to, fiberglass, resin, ceramic, PEEK, etc. Disposing one or more electrodes 402 on non-conductive section 404 may prevent coupling between each electrode 402 during measurement operations. If electrodes 402 are disposed directly to a conductive part of liner hanger 108, coupling may occur. Coupling is when current transmitted from an electrode moves directly to an adjacent electrode 402 disposed on liner hanger 108 or acquisition unit 408, discussed below, without moving through subterranean formation 302. This may skew measurements and may lead to an inability to determine formation fluids 412 moving through sensing domain 504 (e.g., referring to FIG. 5). Removing coupling may allow capacitance tomography of production flow through the section of liner hanger 108 in which non-conductive section 404 is disposed. Capacitance tomography may be found by processing measurements taken by acquisition units 408, discussed below. Processing may be performed by information handling system 406.

Information handling system 406 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 406 may be a processing unit 414, a network storage device, or any other suitable device and may vary in size, shape, performance, functionality, and price. Information handling system 406 may include random access memory (RAM), one or more processing resources such as a central processing unit (CPU) or hardware or software control logic, ROM, and/or other types of nonvolatile memory. Additional components of the information handling system 406 may include one or more disk drives, one or more network ports for communication with external devices as well as an input device 416 (e.g., keyboard, mouse, etc.) and video display 418. Information handling system 406 may also include one or more buses operable to transmit communications between the various hardware components.

Alternatively, systems and methods of the present disclosure may be implemented, at least in part, with non-transitory computer-readable media 420. Non-transitory computer-readable media 140 may include any instrumentality or aggregation of instrumentalities that may retain data and/or instructions for a period of time. Non-transitory computer-readable media 140 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Additionally, as illustrated, information handling system 406 may be connected to one or more acquisition units 408 through a communication line 410. Acquisition units 408 may be permanently disposed downhole and may be connected to one or more electrodes 402 by any wired or wireless devices. During operations, acquisition units 408 may sequentially excite electrode pairs 402 disposed on liner hanger 108 with current and measure voltage across each electrode 402. Generally, one acquisition unit 408 may be utilized for each is needed for an electrode station 702, discussed below (e.g., referring to FIG. 7). Measurements recorded by acquisition units 408 are communicated to information handling system 406, which may be disposed at surface or in wellbore 104 (e.g., referring to FIG. 1), through communication line 210, which may be a fiber optic cable, wired cable, wirelines cable, and/or the like.

Figure 5:
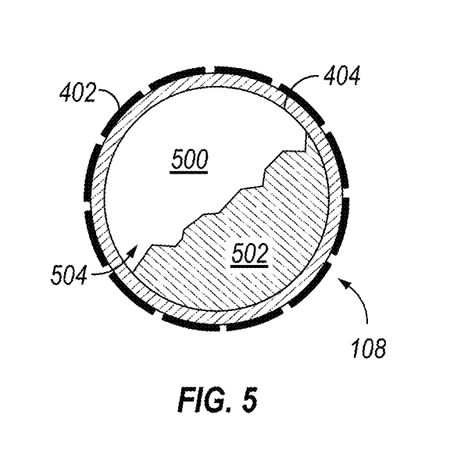
FIG. 5 is a map of a sensing domain.
Figure 6A:
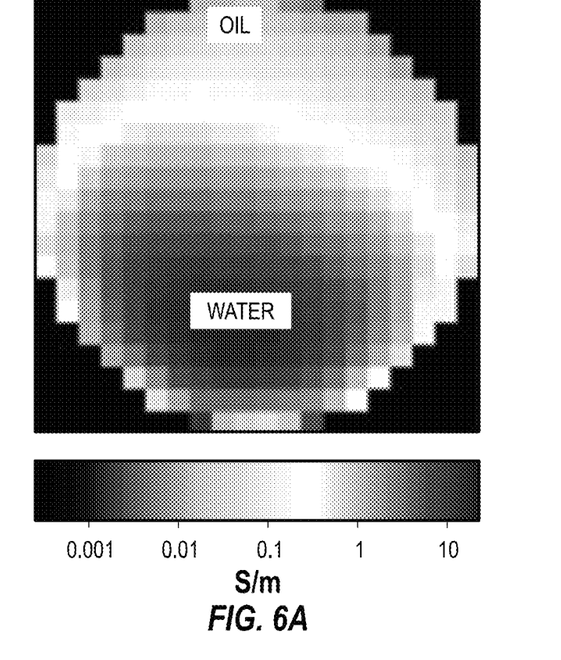
FIG. 6A is a map showing conductivity in the sensing domain.
Figure 6B:
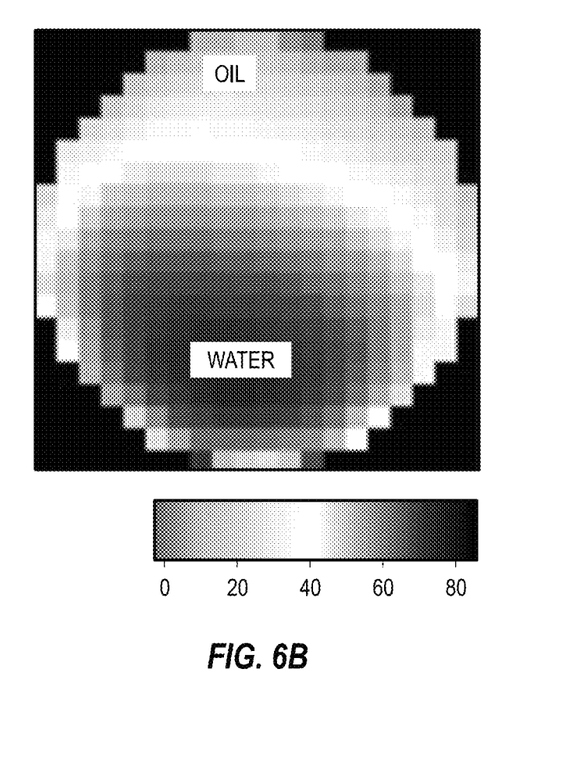
FIG. 6B is a map showing permittivity in the sensing domain.

FIG. 5 illustrates a top-down view of liner hanger 108. Specifically, a cut away view of liner hanger 108 at a location on liner hanger 108 in which non-conductive material 404 is disposed as part of liner hanger 108. Additionally, one or more electrodes 402 for ECT system 400 are disposed on and/or in non-conductive material 404. During operations, one or more electrodes 402 may operate to determine any number of fluids within sensing domain 504. Measurements taken by one or more electrodes 402 may include electrical properties of the fluids within sensing domain 504. Measurements may be processed and analyzed by information handling system 406 using the methods and systems described above. In this example, without limitation, there is a first fluid 500 and a second fluid 502 within sensing domain 504. This may be performed by injecting a current in the MHz range through first fluid 500 and second fluid 502 using one or more electrodes 402. FIGS. 6A and 6B illustrate measurements taken from ECT system 400 (i.e., referring to FIG. 4). Specifically, FIG. 6A is a cross-sectional map of measured conductivity and FIG. 6B is a cross-sectional map of permittivity. These maps may be created on information handling system 406, utilizing measurements taken by ECT system 400 and transmitted to information handling system 406 using the methods and systems described above. Using the measurements in FIGS. 6A and 6B, the phase of measured formation fluids may be identified.

Figure 7:
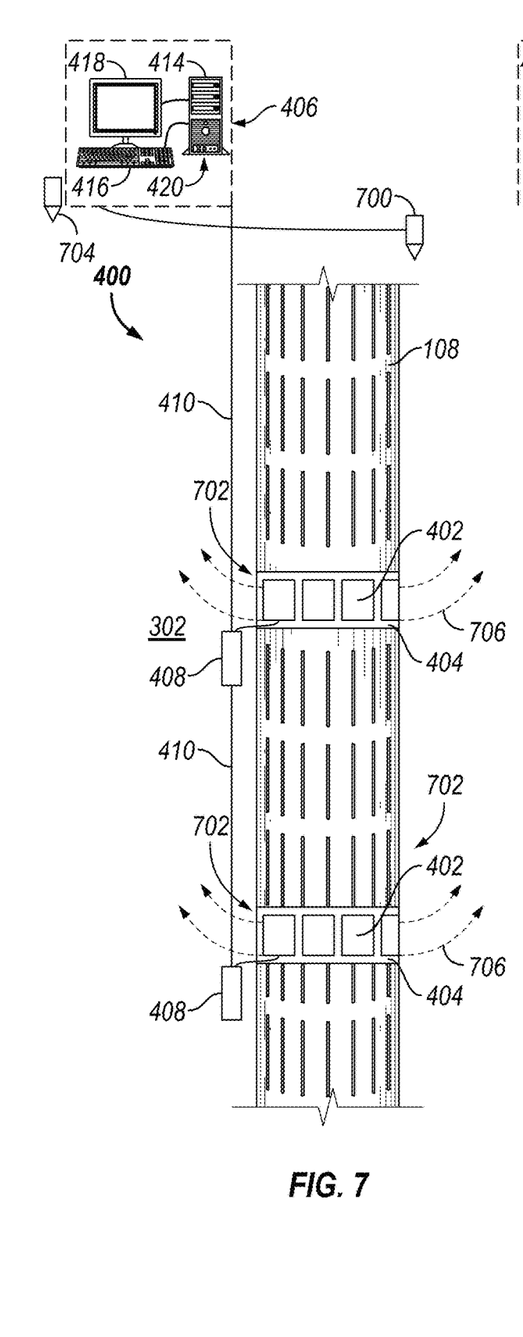
FIG. 7 is an example of a formation monitoring operation.

FIG. 7 illustrates an example where ECT system 400 may be utilized for monitoring of subterranean formation 302. For FIGS. 7-9, sensing domain 504 is subterranean formation 302. As illustrated, one or more electrode stations 702, which include one or more electrodes 402, disposed on non-conductive material 404 of liner hanger 108 may inject current 706 as a monopole excitation into subterranean formation 302. Thus, all electrodes 402 may inject current 706 through subterranean formation 302 to a common current return 700 that is connected to information handling system 406 by a communication line 410. It should be noted that current 706 injected into subterranean formation 302 may be in a frequency range of 0.1 Hz to 1 MHz. In examples, common current return 700 may be disposed in the surface. During measurement operations, as current 706 flows through subterranean formation 302 to common current return 700, acquisition unit 408 may measure voltage by measuring a potential difference using a voltage reference. The potential difference may be measured between each electrode station 702 and potential reference point 704. Additionally, acquisition unit 408 communicates measured voltage to the information handling system 406. Thus, information handling system 406 may process the measured voltage to determine the resistivity distribution of the formation and the distance to a flood front.

Figure 8:
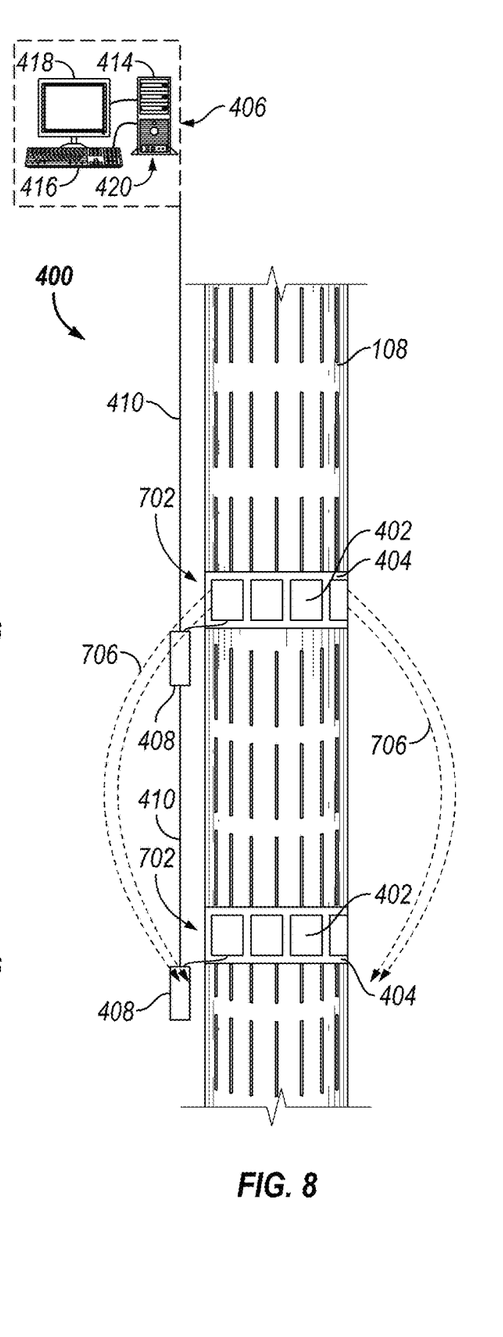
FIG. 8 is another example of the formation monitoring operation.
Figure 9:
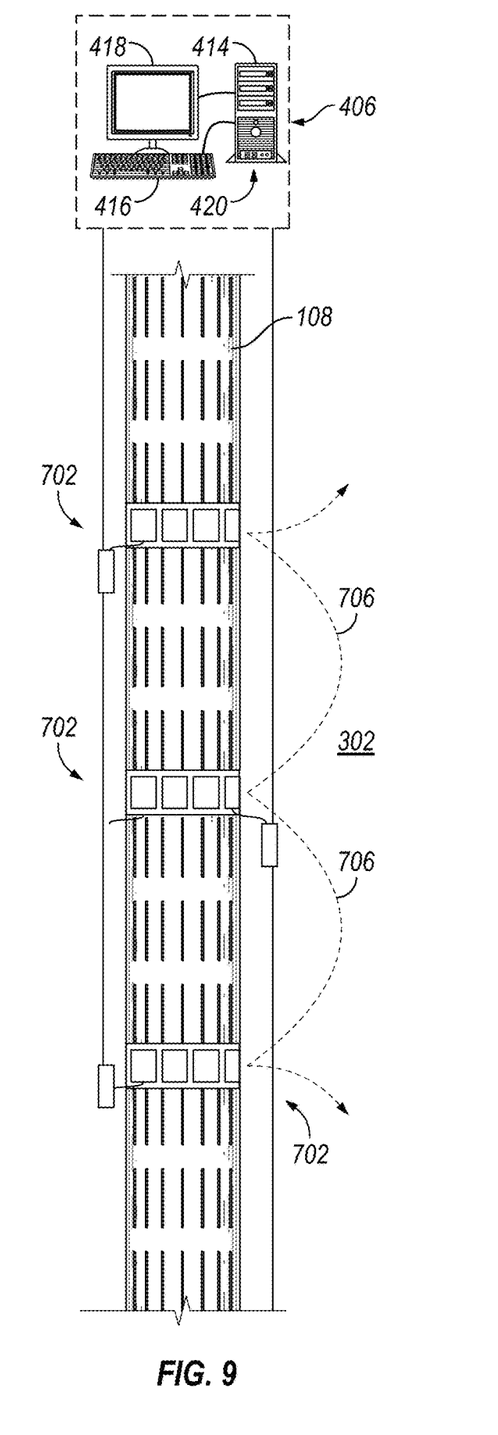
FIG. 9 is another example of the formation monitoring operation.

FIG. 8 illustrates another example of an operation that utilizes ECT system 400 for formation monitoring. In the illustrated example, electrode stations 702 may emit current 7060 as a dipole excitation, where current 706 is injected into subterranean formation 302 from one electrode station 702 and returns to another electrode station 702. In examples, the spacing between each electrode station 702 may determine the depth of current 706 penetration into subterranean formation 302. For example, a distance of about ten feet (about 3 meters) between electrodes stations 702 may render current penetration of about ten feet (about 3 meters) into subterranean formation 302. Additionally, information handling system 406 communicates simultaneously with one or more acquisition units 408 through one or more communication lines 410. Thus, information handling system 406 may determine which electrode station 702 is operating at any point in time and where current 706 may originate from. FIG. 9 illustrates an embodiment of FIG. 8 in which a plurality of electrode stations 702 are daisy chained together. This may allow for multiplexing of the plurality of electrode stations 702 by information handling system 406 to cover an extended length of monitoring subterranean formation 302.

Figure 10:
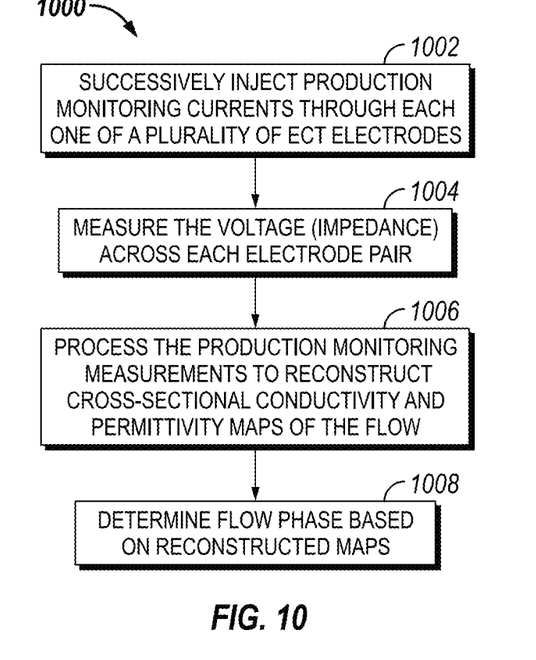
FIG. 10 is a workflow for production operations.

FIG. 10 illustrates workflow 1000 for production operations that may be monitored by ECT system 400 (e.g., referring to FIG. 4). During production operations, workflow 1000 may begin with block 1002. In block 1002, one or more currents may be injected by one or more electrodes 402 into a sensing domain, disposed within liner hanger 108 (e.g., referring to FIG. 4). In block 1004, a voltage (impedance) is measured across pairs of electrodes 402. The measurements are transferred to information handling system 406 (e.g., referring to FIG. 4). In block 1006, the measurements may be processed by information handling system 406 to reconstruct a cross-sectional conductivity and permittivity map of the flow of formation fluid through the sensing domain at any time during production operations. In block 1008, the phase of formation fluids in the sensing domain are determined utilizing the reconstructed maps of conductivity and permittivity.

Figure 11:
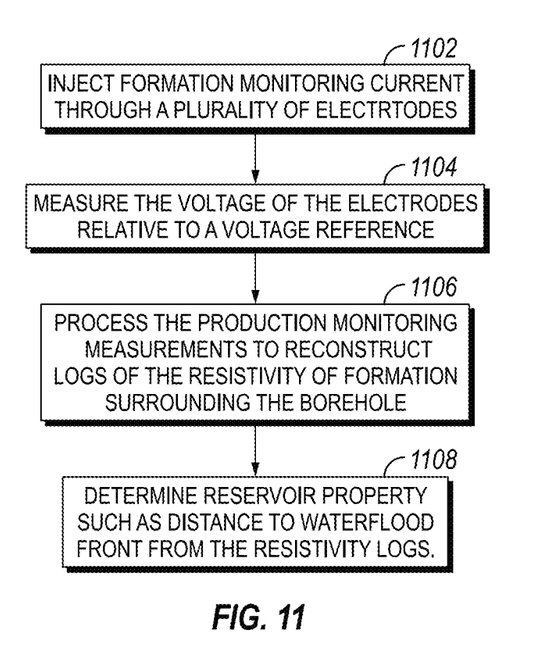
FIG. 11 is a workflow for formation monitoring operations.

FIG. 11 illustrates workflow 1100 for operations to monitor subterranean formation 302 (e.g., referring to FIG. 3). During monitoring operations, workflow 1100 may begin with block 1102. In block 1102, one or more currents may be injected by one or more electrodes 402 into a sensing domain, which is subterranean formation 302. In block 1104, a voltage (impedance) is measured across pairs of electrodes 402, which may be disposed at separate electrode stations 702 (e.g., referring to FIG. 7). The measurements are transferred to information handling system 406 (e.g., referring to FIG. 4). In block 1106, the measurements may be processed by information handling system 406 to reconstruct resistivity logs that may be used as measurements of formation surrounding liner hanger 108. In block 1108, reservoir properties may be determined, such as distance to a waterflood front, utilizing the resistivity logs.

Generally, the electrical capacitance tomography (ECT) system and methods of operation discussed above is an improvement over current technology in that the ECT system and methods may be installed and operated at a relatively low cost compared to other imaging technologies, such as MRI or X-ray tomography. The methods described above may be performed simultaneously, which may allow for the same electrodes for capacitive tomography to be utilized for identifying production flow and further allow for galvanic sensing of formation fluids. Additionally, the ECT system is disposed on a non-conductive sections to production tubing or liner hangers to allow capacitance tomography of production flow. ECT improvement over current technology also encompass methods and systems that perform simultaneous use of the same electrodes on non-conductive section of liner hanger for capacitive tomography of production flow and galvanic sensing of formation fluids.

The preceding description provides various embodiments of systems and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

Statement 1. A system may comprise at least one electrode station that is disposed on a non-conductive material, wherein the non-conductive material is at least a part of a conduit, and at least two electrodes coupled to the at least one electrode station, wherein the at least two electrodes are configured to inject a current into a sensing domain. The system may further comprise at least one acquisition unit that is configured to measure a voltage across the two electrodes of the at least one electrode station, and an information handling system connected to the at least one acquisition unit and configured to identify one or more electrical properties of the sensing domain from the measured voltage.

Statement 2. The system of statement 1, wherein the conduit is a production tubing disposed inside an outer casing.

Statement 3. The system of statements 1 or 2, wherein the conduit is a production tubing or a liner hanger disposed inside an open-hole section of a wellbore.

Statement 4. The system in statement 3, wherein the production tubing or the liner hanger have one or more perforations or one or more slots.

Statement 5. The system of any preceding statements 1, 2, or 3, wherein the non-conductive material is fiberglass.

Statement 6. The system of any preceding statements 1-3, or 5, wherein the at least two electrodes are disposed circumferentially on an outer surface of the non-conductive material.

Statement 7. The system any preceding statements 1-3, 5, or 6, wherein the sensing domain is inside the conduit, the current is in a range from 1 MHz to 1000 MHz, and the current is capacitively coupled through the non-conductive material and one or more fluids within the sensing domain to the at least two electrodes.

Statement 8. The system any preceding statements 1-3, or 5-7, wherein the information handling system is further configured to reconstruct a cross-sectional conductivity and a cross-sectional permittivity of the sensing domain.

Statement 9. The system of statement 8, wherein the information handling system is further configured to identifying one or more phases of a formation fluid in the sensing domain utilizing the cross-sectional conductivity or the cross-sectional permittivity.

Statement 10. The system any preceding statements 1-3 or 5-8, wherein the information handling system is disposed at surface and a fiber optic cable connect the information handling system to the at least one acquisition unit.

Statement 11. The system any preceding statements 1-3, 5-8, or 10, wherein the sensing domain is disposed in a subterranean formation, and the current flows through the subterranean formation surrounding the at least one electrode station to a current return, and the voltage is measured relative to a voltage reference.

Statement 12. The system of statement 11, wherein the current is in a frequency range of 0.1 Hz to 1 MHz, and is coupled conductively or capacitively into the subterranean formation.

Statement 13. The system of statement 11, wherein the information handling system is further configured to identify a resistivity of the subterranean formation from the current and the voltage.

Statement 14. The system of statement 11, wherein the current is injected simultaneously into two or more sensing domains and the at least one acquisition until is configured to use frequency division multiplexing to separate one or more responses within the two or more sensing domains.

Statement 15. The system of statement 11, wherein the acquisition unit is configured to measure a potential difference of the current flowing between a first electrode station and a second electrode station and the information handling system is further configured to identifying a formation resistivity from the potential difference.

Statement 16. The system of statement 11, wherein each electrode stations is separated from another electrode station by one or more distances.

Statement 17. A method may comprise injecting a current into a sensing domain with at least two electrodes disposed on at least one electrode station, measuring a voltage across the at least two electrodes at the at least one electrode station using an acquisition unit, and sending the measured voltage to an information handling system connected to the acquisition unit by at least one communication line.

Statement 18. The method of statement 17, further comprising constructing a cross-sectional conductivity and a cross-sectional permittivity of the sensing domain with the measured voltage using the information handling system.

Statement 19. The method of statement 18, further comprising identifying one or more phases of a formation fluid in the sensing domain utilizing the cross-sectional conductivity or the cross-sectional permittivity.

Statement 20. The method of statements 17 or 18, further comprising injecting the current into two or more sensing domains simultaneously with the at least two electrodes.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present embodiments are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A system comprising:
   at least one electrode station that is disposed on a non-conductive material, wherein the non-conductive material is at least a part of a conduit;
   at least two electrodes coupled to the at least one electrode station, wherein the at least two electrodes are configured to inject a first current into a first sensing domain;
   at least one acquisition unit that is configured to measure a voltage across the two electrodes of the at least one electrode station; and
   an information handling system connected to the at least one acquisition unit and configured to identify one or more electrical properties of the first sensing domain from the measured voltage, wherein the first sensing domain is inside the conduit, and the first current is capacitively coupled through the non-conductive material and one or more fluids within the first sensing domain to the at least two electrodes.

2. The system of claim 1, wherein the conduit is a production tubing disposed inside an outer casing.

3. The system of claim 1, wherein the conduit is a production tubing or a liner hanger disposed inside an open-hole section of a wellbore.

4. The system in claim 3, wherein the production tubing or the liner hanger have one or more perforations or one or more slots.

5. The system of claim 1, wherein the non-conductive material is fiberglass.

6. The system of claim 1, wherein the at least two electrodes are disposed circumferentially on an outer surface of the non-conductive material.

7. The system of claim 1, wherein the first current is in a range from 1 MHz to 1000 MHz.

8. The system of claim 1, wherein the information handling system is further configured to reconstruct a cross-sectional conductivity and a cross-sectional permittivity of the first sensing domain.

9. The system of claim 8, wherein the information handling system is further configured to identifying one or more phases of a formation fluid in the first sensing domain utilizing the cross-sectional conductivity or the cross-sectional permittivity.

10. The system of claim 1, wherein the information handling system is disposed at surface and a fiber optic cable connect the information handling system to the at least one acquisition unit.

11. The system of claim 1, wherein a second sensing domain is disposed in a subterranean formation, and a second current flows through the subterranean formation surrounding the at least one electrode station to a current return, and the voltage is measured relative to a voltage reference.

12. The system of claim 11, wherein the second current is in a frequency range of 0.1 Hz to 1 MHz, and is coupled conductively or capacitively into the subterranean formation.

13. The system of claim 11, wherein the information handling system is further configured to identify a resistivity of the subterranean formation from the second current and the voltage.

14. The system of claim 11, wherein the first current and the second current are injected simultaneously into the first sensing domain, the second sensing domain, and the at least one acquisition until is configured to use frequency division multiplexing to separate one or more responses within the first sensing domain and the second sensing domain.

15. The system of claim 11, wherein the acquisition unit is configured to measure a potential difference of the second current flowing between a first electrode station and a second electrode station and the information handling system is further configured to identifying a formation resistivity from the potential difference.

16. The system of claim 11, wherein each electrode stations is separated from another electrode station by one or more distances.

17. A method comprising:
   injecting a current into a sensing domain with at least two electrodes disposed on at least one electrode station, wherein the first sensing domain is inside the conduit, and the current is capacitively coupled through the non-conductive material and one or more fluids within the first sensing, domain to the at least two electrodes;
   measuring a voltage across the at least two electrodes at the at least one electrode station using an acquisition unit; and
   sending the measured voltage to an information handling system connected to the acquisition unit by at least one communication line.

18. The method of claim 17, further comprising constructing a cross-sectional conductivity and a cross-sectional permittivity of the sensing domain with the measured voltage using the information handling system.

19. The method of claim 18, further comprising identifying one or more phases of a formation fluid in the sensing domain utilizing the cross-sectional conductivity or the cross-sectional permittivity.

20. The method of claim 17, further comprising injecting the current into two or more sensing domains simultaneously with the at least two electrodes.

* * * * *